United States Patent
Nagasawa (10) Patent No.: US 10,152,439 B2
(45) Date of Patent: Dec. 11, 2018

(54) SEMICONDUCTOR DEVICE (71) Applicant: Renesas Electronics Corporation, Tokyo (JP)

(72) Inventor: Kazuhiro Nagasawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 58 days.

(21) Appl. No.: 15/095,032

(22) Filed: Apr. 9, 2016

(65) Prior Publication Data
US 2016/0350243 A1 Dec. 1, 2016

(30) Foreign Application Priority Data
May 27, 2015 (JP) ................... 2015-107301

(51) Int. Cl.
G06F 13/00 (2006.01)
G06F 13/24 (2006.01)
G06F 13/372 (2006.01)
G06F 13/12 (2006.01)

(52) U.S. Cl.
CPC ............ G06F 13/24 (2013.01); G06F 13/122 (2013.01); G06F 13/372 (2013.01)

(58) Field of Classification Search
None
See application file for complete search history.

(56) References Cited

U.S. PATENT DOCUMENTS 5,061,922 A * 10/1991 Nishijima ............ G08B 26/002
340/3.62
5,206,933 A * 4/1993 Farrell .................... H04L 29/06
370/463

(Continued)

FOREIGN PATENT DOCUMENTS

JP H 05-274160 A 10/1993
JP H06-318157 A 11/1994

(Continued)

OTHER PUBLICATIONS

Japanese Office Action dated Jul. 10, 2018, English translation thereof.

*Primary Examiner* — Michael Sun
(74) *Attorney, Agent, or Firm* — McGinn I.P. Law Group, PLLC (57) ABSTRACT

A semiconductor device in which, in principle, plural interrupt request signals can be inputted to a single interrupt terminal is provided. In the semiconductor device, peripheral devices output interrupt request signals of mutually different waveforms. When an interrupt request signal outputted from one of the peripheral devices is received, a microcomputer unit identifies the one of the peripheral devices based on the waveform of the received interrupt request signal. When an interrupt request signal is outputted from any one of the peripheral devices, the interrupt request signal is also inputted to the other ones of the peripheral devices. When one of the peripheral devices receives an interrupt request signal outputted from another one of the peripheral devices, the one of the peripheral devices can output an interrupt request signal of its own only after elapse of a predetermined output inhibition time.

20 Claims, 11 Drawing Sheets

(56) References Cited

U.S. PATENT DOCUMENTS

| | | | | |
|---|---|---|---|---|
| 6,023,740 A | * | 2/2000 | Korhonen | G06F 13/26 710/124 |
| 7,222,219 B2 | * | 5/2007 | Matsuda | G06F 13/24 711/137 |
| 2004/0225772 A1 | * | 11/2004 | Eichler, Jr. | G06F 13/423 710/200 |
| 2007/0186021 A1 | * | 8/2007 | Drexler | G06F 13/24 710/260 |
| 2007/0204087 A1 | * | 8/2007 | Birenbach | G06F 9/4812 710/264 |
| 2008/0140895 A1 | * | 6/2008 | Baker | G06F 13/24 710/262 |
| 2012/0023358 A1 | * | 1/2012 | Nakamura | G06F 1/3237 713/500 |

FOREIGN PATENT DOCUMENTS

| | | |
|---|---|---|
| JP | 2009-271569 A | 11/2009 |
| JP | 2012-221373 A | 11/2012 |

* cited by examiner

| OUTPUTS OF PERIPHERAL ICs | | | INPUT TO MCU |
|---|---|---|---|
| PERIPHERAL IC1 | PERIPHERAL IC2 | PERIPHERAL IC3 | |
| 1 | 0 | 0 | $4 \cdot Vo$ |
| 1 | 1 | 0 | $6 \cdot Vo$ |
| 1 | 0 | 1 | $5 \cdot Vo$ |
| 1 | 1 | 1 | $7 \cdot Vo$ |
| 0 | 1 | 0 | $2 \cdot Vo$ |
| 0 | 1 | 1 | $3 \cdot Vo$ |
| 0 | 0 | 1 | $Vo$ |

| OUTPUTS OF PERIPHERAL ICs ||| INPUT TO MCU |
|---|---|---|---|
| PERIPHERAL IC1 | PERIPHERAL IC2 | PERIPHERAL IC3 | |
| 1 | 0 | 0 | $(1/2) \cdot Vdd$ |
| 1 | 1 | 0 | $(2/5) \cdot Vdd$ |
| 1 | 0 | 1 | $(3/7) \cdot Vdd$ |
| 1 | 1 | 1 | $(6/17) \cdot Vdd$ |
| 0 | 1 | 0 | $(2/3) \cdot Vdd$ |
| 0 | 1 | 1 | $(6/11) \cdot Vdd$ |
| 0 | 0 | 1 | $(3/4) \cdot Vdd$ |

SEMICONDUCTOR DEVICE

CROSS-REFERENCE TO RELATED APPLICATIONS

The disclosure of Japanese Patent Application No. 2015-107301 filed on May 27, 2015 including the specification, drawings and abstract is incorporated herein by reference in its entirety.

BACKGROUND

The present invention relates to a semiconductor device and is suitably applicable, for example, to interrupt control between a microcomputer and peripheral devices.

In developing a microcomputer, the number of interrupt terminals is, in many cases, limited to reduce the chip cost. In this connection, attempts to use an interrupt terminal to be shared by plural peripheral devices have so far been reported.

For example, it is disclosed in Japanese Unexamined Patent Application Publication No. Hei 5(1993)-274160 (patent document 1) that plural interrupt request signals are encoded into a binary code by an encoder and that the encoded signal is outputted to interrupt/general-purpose ports of a microcomputer.

Japanese Unexamined Patent Application Publication No. 2009-271569 (patent document 2) discloses a semiconductor integrated circuit in which an input terminal is used both for serial reception and for external interrupts.

SUMMARY

In the technique disclosed in the patent document 1, plural interrupt request signals are encoded into a binary code, so that the number of signals that can be reduced is limited. For example, it is not possible to consolidate three or more interrupt request signals into one signal. In the technique disclosed in the patent document 2, it is not possible to consolidate plural interrupt request signals. Thus, in related-art techniques, there is a limit to decreasing the number of interrupt terminals.

Other objects and novel features of the present invention will become apparent from the following description and attached drawings.

In a semiconductor device according to a first embodiment of the present invention, peripheral devices output interrupt request signals of mutually different waveforms. When an interrupt request signal outputted from one of the peripheral devices is received, a microcomputer unit identifies the one of the peripheral devices based on the waveform of the received interrupt request signal. When an interrupt request signal is outputted from any one of the peripheral devices, the interrupt request signal is also inputted to the other ones of the peripheral devices. When one of the peripheral devices receives an interrupt request signal outputted from another one of the peripheral devices, the one of the peripheral devices can output an interrupt request signal of its own only after elapse of a predetermined output inhibition time.

According to the above embodiment, plural interrupt request signals can be inputted to a single interrupt terminal in principle.

DETAILED DESCRIPTION

In the following, embodiments of the present invention will be described in detail with reference to drawings. In the following description, parts which are identical or equivalent between the embodiments will be denoted by identical reference symbols and such parts will not be repeatedly described.

First Embodiment

<Configuration of Semiconductor Device>

Figure 1:
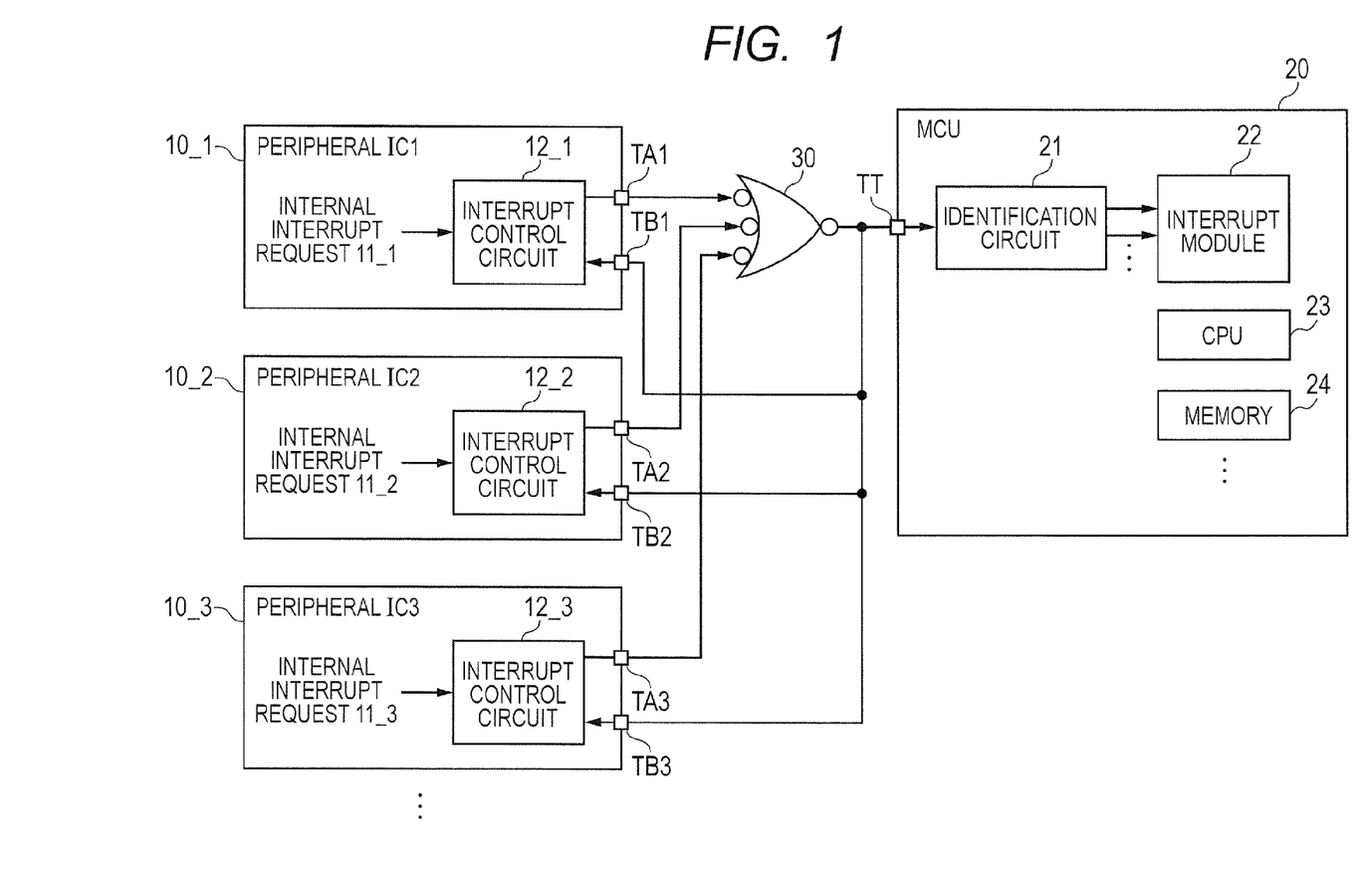
FIG. 1 is a block diagram showing the configuration of a semiconductor device according to a first embodiment of the present invention.

FIG. 1 is a block diagram showing the configuration of a semiconductor device according to a first embodiment of the present invention. The semiconductor device shown in FIG. 1 includes peripheral integrated circuits (ICs) 10_1, 10_2, 10_3, - - -, an OR circuit 30, and a microcomputer unit (MCU) 20. In the following description, peripheral ICs 10_i (i=1, 2, 3, - - -) may collectively be denoted as "peripheral ICs 10" and an unspecified one of them may be denoted as a "peripheral IC 10."

The peripheral ICs 10_i (i=1, 2, 3, - - - ) output, based on internal interrupt request signals 11_i, external interrupt request signals from output terminals TAi. The external output request signals outputted from the peripheral ICs IC_i are inputted, via an OR circuit 30, to a common interrupt terminal TT provided in an MCU 20.

In the example shown in FIG. 1, the external interrupt request signals are low (L) active signals (to be "1" at low (L) level and "0" at high (H) level). When at least one of the input signals is at L level ("1"), the OR circuit 30 outputs an L-level signal ("1"). When all input signals are at H level ("0"), the OR circuit 30 outputs a high-level signal ("0").

Interrupt control circuits 12_i provided in the peripheral ICs 10_i (i=1, 2, 3, - - -) generate, based on internal interrupt request signals 11_i, external interrupt request signals whose waveforms differ between the peripheral ICs. When an external interrupt request signal is received, the MCU 20 can identify the output source of the external interrupt request signal (i.e., the interrupt request source) based on the waveform of the received external interrupt request signal.

Each of the interrupt control circuits 12_i included in the peripheral ICs 10_i (i=1, 2, 3, - - -) receives, via an input terminal TBi, outputs of the OR circuit 30 (i.e. external interrupt request signals outputted from other peripheral ICs.) The interrupt control circuits 12_i are configured such that, when an interrupt control circuit 12_i receives an external interrupt request signal (L-active signal) from another peripheral IC 10_j (j≠i), the interrupt control circuit 12_i itself can output an external interrupt request signal (L-active signal) only after elapse of a predetermined output inhibition time. In this way, the peripheral ICs 10_i respectively output external interrupt request signals (L-active signals) to the MCU 20, basically, at different times, so that coincidence of plural external interrupt request signals (L-active signals) (hereinafter referred to as an "interrupt conflict") does not occur.

There can, however, be cases where plural external interrupt request signals (L-active signals) are outputted from plural peripheral ICs at a time (or in a time range corresponding to the operation delay time of the interrupt control circuits 12_i) (i.e. an interrupt conflict occurs). The waveforms allocated for use as external interrupt request signals to the respective peripheral ICs are required to be respectively discernible even when such an interrupt conflict occurs. Concrete examples of such waveforms will be described later with reference to FIGS. 2 and 3.

The MCU 20 includes an identification circuit 21, an interrupt module 22, a central processing unit (CPU) 23, a memory 24, and other modules, not shown, like a direct memory access (DMA) controller.

When an external interrupt request signal is received via the interrupt terminal TT, the identification circuit 21 identifies, based on the waveform of the received external interrupt request signal, the output-source peripheral IC 10 that outputted the external interrupt request signal. The identification circuit 21 then outputs a digital signal representing the identification result to the output module 22.

Based on the identification result communicated from the identification circuit 21, the interrupt module 22 performs interrupt control, for example, over the CPU 23 and the DMA controller, not shown.

<Example Waveforms of External Interrupt Request Signals>

Figure 2:
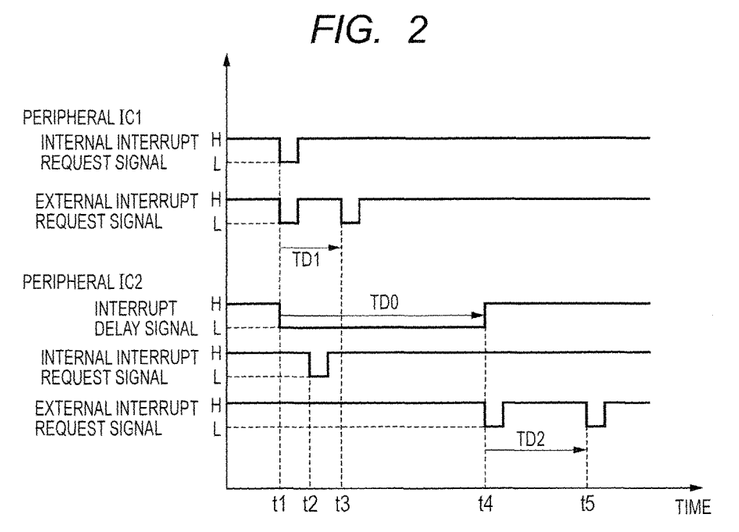
FIG. 2. is a timing diagram showing example waveforms of external interrupt request signals outputted from peripheral ICs shown in FIG. 1.

FIG. 2. is a timing diagram showing example waveforms of external interrupt request signals outputted from peripheral ICs shown in FIG. 1. In the example shown in FIG. 2, peripheral ICs 10_1 and 10_2 each output two pulses as external interrupt request signals at an interval uniquely allocated to each of them. The pulse signals outputted are L-active signals. Based on the time interval between the two pulses received from each of the peripheral ICs 10_1 and 10_2, the identification circuit 21 of the MCU 20 identifies the output sources of the received external interrupt request signals. This will be described more specifically in the following.

Referring to FIGS. 1 and 2, when an internal interrupt request signal 11_1 becomes active at time t1, the interrupt control circuit 12_1 of the peripheral IC 1 (10_1) outputs a first pulse as an external interrupt request signal. The interrupt control circuit 12_1 outputs a second pulse at time t3, i.e. upon elapse from time t1 of a unique amount of time TD1 allocated to the peripheral IC 1 (10_1). Based on the time interval between the first and second pulses, the identification circuit 21 of the MCU 20 determines that the external interrupt request is from the peripheral IC 1 (10_1).

The first pulse outputted from the peripheral IC 1 (10_1) at time t1 is also inputted to the other peripheral ICs. Based on the first pulse received from the peripheral IC 1 (10_1), the peripheral IC 2 (10_2) keeps the interrupt delay signal active (L level) during a predetermined output inhibition time TD0 from time t1. The output inhibition time TD0 is larger than the largest one of the unique interval times (interval times between the first and second pulses) allocated to the peripheral ICs.

Next, the interrupt control circuit 12_2 of the peripheral IC 2 (10_2) detects that the internal interrupt request signal 11_2 has become active at time t2. When, at time t4, the interrupt delay signal becomes inactive (H level), the interrupt control circuit 12_2 outputs a first pulse. Furthermore, the interrupt control circuit 12_2 outputs a second pulse at time t5, i.e., upon elapse from time t4 of a unique amount of time TD2 allocated to the peripheral IC 2 (10_2). Based on the time interval TD2 between the first and second pulses, the identification circuit 21 of the MCU 20 determines that the external interrupt request is from the peripheral IC 2 (10_2).

Figure 3:
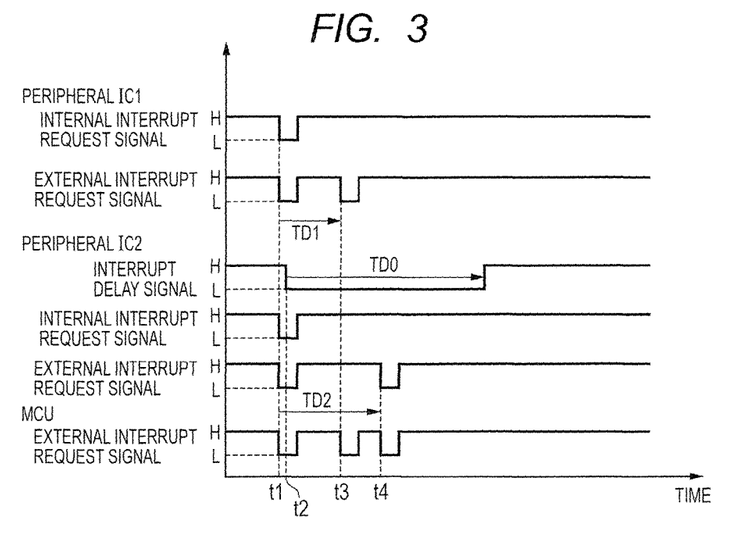
FIG. 3 is a timing diagram showing other example waveforms of external interrupt request signals outputted from peripheral ICs shown in FIG. 1.

FIG. 3 is a timing diagram showing other example waveforms of external interrupt request signals outputted from peripheral ICs shown in FIG. 1. In the example shown in FIG. 3, the peripheral ICs 1 (10_1) and 2 (10_2) output external interrupt request signals at a same time, i.e., an interrupt conflict occurs. This will be described more specifically in the following with reference to FIGS. 1 and 3.

When the interrupt control circuit 12_1 of the peripheral IC 1 (10_1) detects that the internal interrupt request signal 11_1 has become active at time t1, the interrupt control circuit 12_1 outputs a first pulse as an external interrupt request signal.

The interrupt control circuit 12_2 of the peripheral IC 2 (10_2) detects that the internal interrupt request signal 11_2 has become active also at time t1. As described with reference to FIG. 2, the first pulse outputted from the peripheral IC 1 (10_1) is also inputted to the peripheral IC 2 (10_2). The interrupt control circuit 12_2 of the peripheral IC 2 (10_2) keeps, based on the first pulse inputted thereto, the interrupt delay signal active (L level) during the output inhibition time TD0. However, time t2 at which the interrupt delay signal is set low is slightly behind time t1. Hence, the interrupt control circuit 12_2 of the peripheral IC 2 (10_2) also outputs a first pulse as an external interrupt signal at time t1.

The interrupt control circuit 12_1 of the peripheral IC 1 (10_1) outputs a second pulse at time t3, i.e., upon elapse from time t1 of a unique amount of time TD1 allocated to the peripheral IC 1 (10_1). Similarly, the interrupt control circuit 12_2 of the peripheral IC 2 (10_2) outputs a second pulse at time t4, i.e., upon elapse from time t1 of a unique amount of time TD2 allocated to the peripheral IC 2 (10_2).

As a result, the MCU 20 receives a signal waveform combining the waveform of the external interrupt request signal outputted from the peripheral IC 1 (10_1) and the waveform of the external interrupt request signal outputted from the peripheral IC 2 (10_2). To be more specific, the MCU 20 receives three pulses which become L-active at times t1, t3, and t4. In order not to overlap three pulses, the time interval TD1 between time t1 and time t3 and the time interval TD2 between time t1 and time t4 are set. The MCU 20 can, therefore, determine the time intervals TD1 and TD2 based on the three pulses. Based on the determined time intervals, the MCU 20 can identify the interrupt request sources.

<Example Circuit Configuration>

Figure 4:
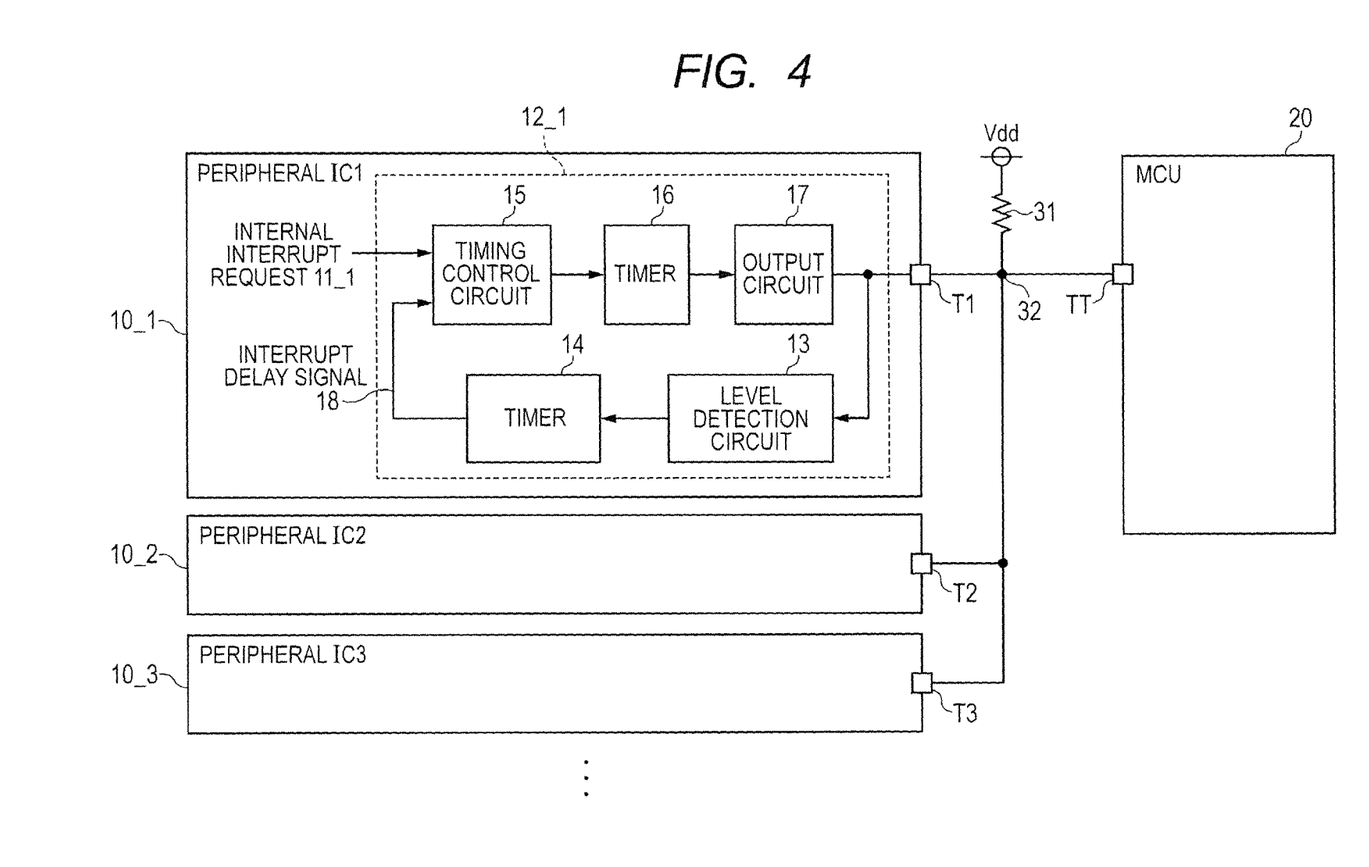
FIG. 4 is a block diagram of a concrete example configuration of the interrupt control circuit provided in each peripheral IC shown in FIG. 1.

FIG. 4 is a block diagram of a concrete example configuration of the interrupt control circuit provided in each peripheral IC shown in FIG. 1.

In the example configuration shown in FIG. 4, the output of each peripheral IC 10_$i$ ($i$=1, 2, 3, - - - ) is an open collector output or an open drain output. In each peripheral IC 10_$i$ ($i$=1, 2, 3, - - - ), an output/input terminal T$i$ functions as both the output terminal TA$i$ and input terminal TB$i$. The output/input terminal T$i$ of each peripheral IC 10_$i$ ($i$=1, 2, 3, - - - ) and the interrupt terminal TT of the MCU 20 are coupled to a common node 32. The common node 32 is coupled to a power supply node Vdd via a pull-up resistor 31. Therefore, a signal determined by wired-ORing the external interrupt request signals outputted from the peripheral ICs 10_$i$ ($i$=1, 2, 3, - - - ) is inputted to the interrupt terminal TT of the MCU 20.

An interrupt control circuit 12_1 includes a level detection circuit 13, a timer 14, a timing control circuit 15, a timer 16, and an output circuit 17. Interrupt control circuits 12_2 and 12_3, though their configurations are not shown in FIG. 4, are configured identically to the interrupt control circuit 12_1, so that the following description of the configuration of the interrupt control circuit 12_1 also applies to the interrupt control circuits 12_2 and 12_3.

The level detection circuit 13 detects the voltage level of the common node 32 via the input/output terminal T1. When there is no external interrupt request signal outputted from other peripheral ICs 10, the voltage at the common node 32 approximately equals the voltage supplied at the power supply node Vdd. In this case, an interrupt delay signal 18 is inactive (H level). When there is an external interrupt request signal outputted from any other peripheral IC 10, the voltage at the common node 32 approximately equals ground voltage. In this case, the interrupt delay signal 18 is kept active (L level) during the output inhibition time counted by the timer 14.

When, with the interrupt delay signal 18 inactive (H level), the internal interrupt request signal 11_1 becomes active (L level), the timing control circuit 15 starts the timer 16. When the timing control circuit 15 detects that, with the interrupt delay signal 18 active (L level), the internal interrupt request signal 11_1 has become active (L level), the timing control circuit 15 starts the timer 16 after waiting until the interrupt delay signal 18 becomes inactive (H level).

The output of the output circuit 17 is open in a normal state. The output circuit 17 outputs a first pulse (L level) when the timer 16 is started and outputs a second pulse (L level) when the timer 16 has counted a predetermined value (corresponding to a unique amount of time allocated to each peripheral IC 10).

Figure 5:
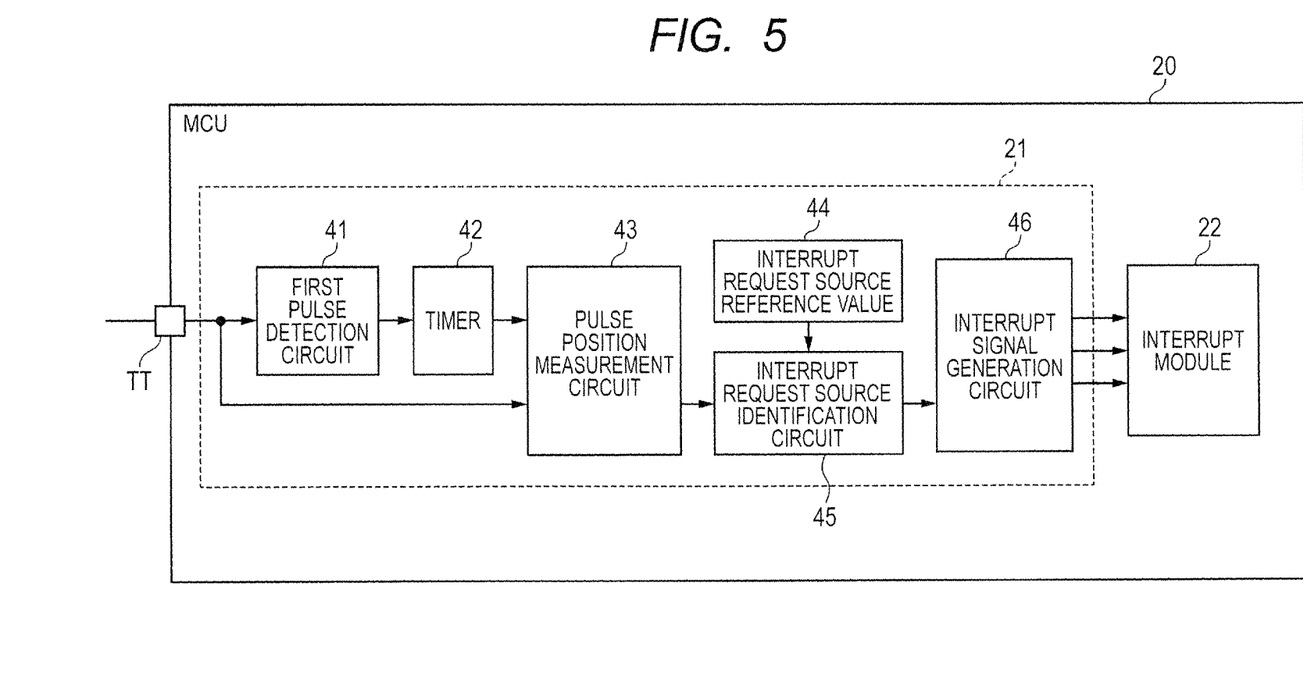
FIG. 5 is a block diagram of an example configuration of the identification circuit provided in the microcomputer unit shown in FIG. 1.

FIG. 5 is a block diagram of an example configuration of the identification circuit 21 provided in the MCU 20 shown in FIG. 1. Referring to FIG. 5, the identification circuit 21 includes a first pulse detection circuit 41, a timer 42, a pulse position measurement circuit 43, a storage unit 44 to store interrupt request source reference values, an interrupt request source identification circuit 45, and an interrupt signal generation circuit 46.

The first pulse detection circuit 41 detects the voltage level of the common node 32 shown in FIG. 4 via the interrupt terminal TT. The first pulse detection circuit 41 starts the timer 42 upon detecting that the voltage at the common node 32 has changed from H level to L level.

After the timer 42 is started, the pulse position measurement circuit 43 collects the count made by the timer 42 during the time until the voltage at the common node 32 returns from H level to L level and outputs the collected timer count value to the interrupt request source identification circuit 45. The interrupt request source identification circuit 45 compares the timer count value received from the pulse position measurement circuit 43 with the interrupt request source reference values and, based on the result of comparison, identifies the interrupt request source. The timer count values corresponding to the unique amounts of time (amounts of the interval time between the first and second pulses) allocated to the respective peripheral ICs are stored beforehand in the storage unit 44. The interrupt signal generation circuit 46 outputs an internal interrupt signal corresponding to the interrupt request source thus identified to the interrupt module 22.

When an interrupt conflict occurs, the pulse position measurement circuit 43 collects as many timer count values as the number of conflicting interrupt signals. Based on such plural timer count values, the interrupt request source identification circuit 45 identifies the plural interrupt request sources. The interrupt signal generation circuit 46 outputs plural internal interrupt signals corresponding to the plural interrupt request sources thus identified to the interrupt module 22.

<Effects>

According to the above semiconductor device, the number of external interrupt terminals of the microcomputer unit can be reduced to a minimum of 1 in principle.

Second Embodiment

According to a second embodiment of the present invention, the waveforms of the external interrupt request signals outputted from the peripheral ICs 10 differ from those according to the first embodiment. The example circuit configurations of the peripheral ICs 10_1, 10_2, - - - and of the MCU 20 according to the second embodiment are identical to those described with reference to FIGS. 1, 4 and 5 in connection with the first embodiment, so that their descriptions will not be repeated in the following.

Figure 6:
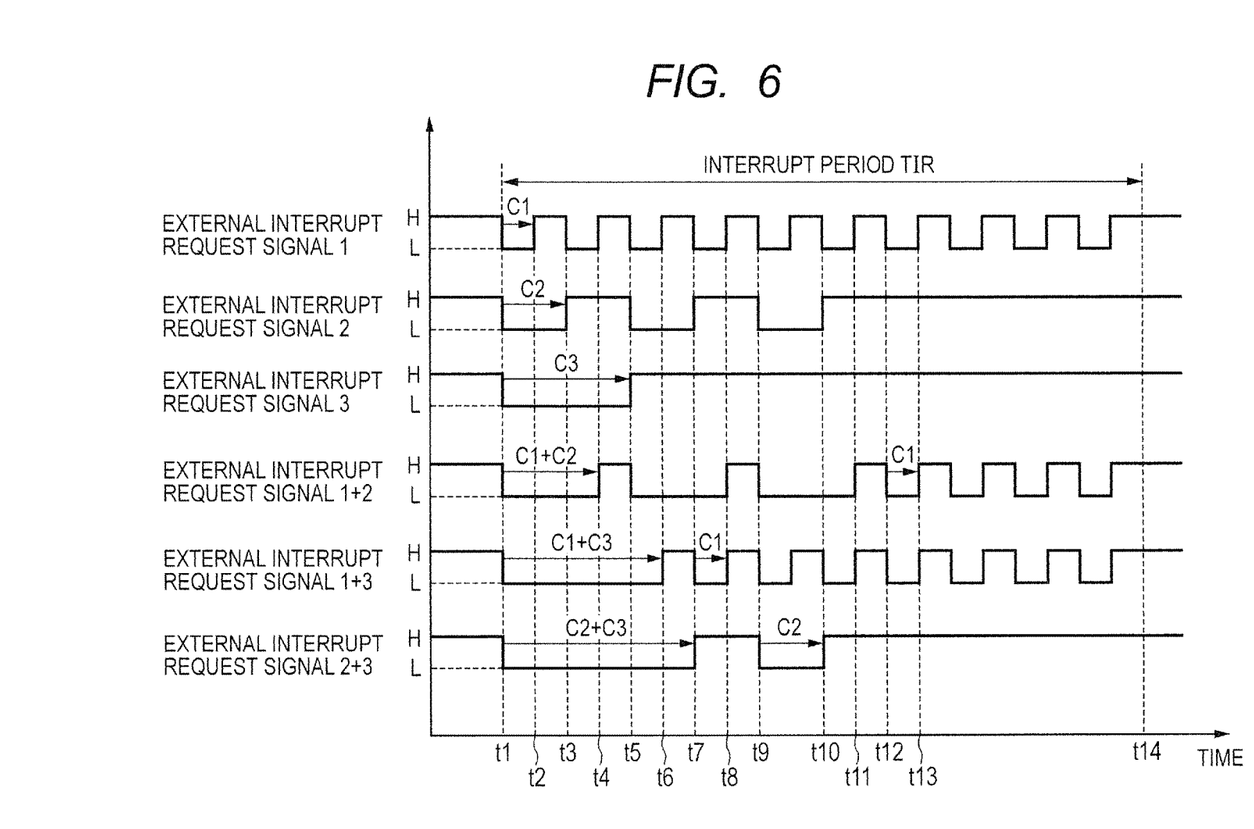
FIG. 6 is a timing diagram showing example waveforms of external interrupt request signals outputted from peripheral ICs included in a semiconductor device according to a second embodiment of the present invention.

FIG. 6 is a timing diagram showing example waveforms of external interrupt request signals outputted from the peripheral ICs included in the semiconductor device according to the second embodiment. In the example shown in FIG. 6, the peripheral ICs 10_1, 10_2, - - - output pulse signals of mutually different cycles as interrupt request signals. The cycles of the respective external interrupt signals are set to be integer multiples of the fundamental cycle.

To be specific, the peripheral IC 1 (10_1) outputs an external interrupt request signal 1 with a cycle of 2×C1 (C1=half cycle). The peripheral IC 2 (10_2) outputs an external interrupt request signal 1 with a cycle of 2×C2 (C2=half cycle). In this case, C2 equals two times C1 (C2=2×C1). Namely, the cycle (2×C2) of the external interrupt request signal 2 is two times the cycle (2×C1) of the external interrupt request signal 1. Also, the peripheral IC 3 (10_3) outputs an external interrupt request signal 3 with a cycle of 2×C3 (C3=half cycle). In this case, C3 equals two times C2 and four times C1 (C3=2×C2=4×C1). Namely, the cycle (2×C3) of the external interrupt request signal 3 is four times the cycle (2×C1) of the external interrupt request signal 1.

Next, a case in which interrupt requests mutually conflict will be described. Referring to FIG. 6, there are conflicts between the external interrupt request signals 1 and 2 (1+2), between the external interrupt request signals 1 and 3 (1+3), and between the external interrupt request signals 2 and 3 (2+3), respectively.

In the case shown in FIG. 6, it is characteristic that external interrupt request signals with shorter cycles have longer output periods. To be specific, the external interrupt request signal 1 has an output period of time t1 to time t14 (5×C3=10×C2=20×C1). The external interrupt request signal 2 has an output period of time t1 to time t12 (3×C3=6×C2=12×C1). The external interrupt request signal 3 has an output period of time t1 to time t9 (2×C3=4×C2=8×C1).

Another characteristic of the case shown in FIG. 6 is that, when the output period of an external interrupt request signal with a shortest cycle is defined as an interrupt period TIR, each peripheral IC 10 can output an external interrupt request signal only once during the interrupt period TIR. In other words, once a peripheral IC 10 outputs an external interrupt request signal, the peripheral IC 10 cannot output another external interrupt request signal until the current interrupt period TIR elapses.

In the way described above, when there are conflicts between external interrupt request signals, all signal cycles of the pulse signals making up the conflicting external interrupt request signals can be detected. To be specific, in the case of an interrupt conflict (1+2), (C1+C2) and C1 can both be detected, so that the cycles of the external interrupt request signals 1 and 2 can be determined. Similarly, in the case of an interrupt conflict (1+3), (C1+C3) and C1 can both be detected, so that the cycles of the external interrupt request signals 1 and 3 can be determined. In the case of an interrupt conflict (2+3), (C2+C3) and C2 can both be detected, so that the cycles of the external interrupt request signals 2 and 3 can be determined.

As described above, in the second embodiment, too, like in the first embodiment, the number of external interrupt terminals of the microcomputer unit can be reduced to a minimum of 1 in principle.

Third Embodiment

According to a third embodiment of the present invention, unlike in the first and second embodiments, the MCU 20 outputs timing pulses, based on which interrupt request signals are outputted, to the peripheral ICs 10 at predetermined intervals. The peripheral ICs 10 can output interrupt request signals in time slots which are allocated to them based on the timing pulses. In this way, in the semiconductor device of the third embodiment, interrupt conflicts cannot occur. Therefore, in the third embodiment unlike in the first and second embodiments, each peripheral IC 10 need not receive external interrupt request signals outputted from other peripheral ICs 10. This will be described in the following with reference to FIGS. 7 and 8.

Figure 7:
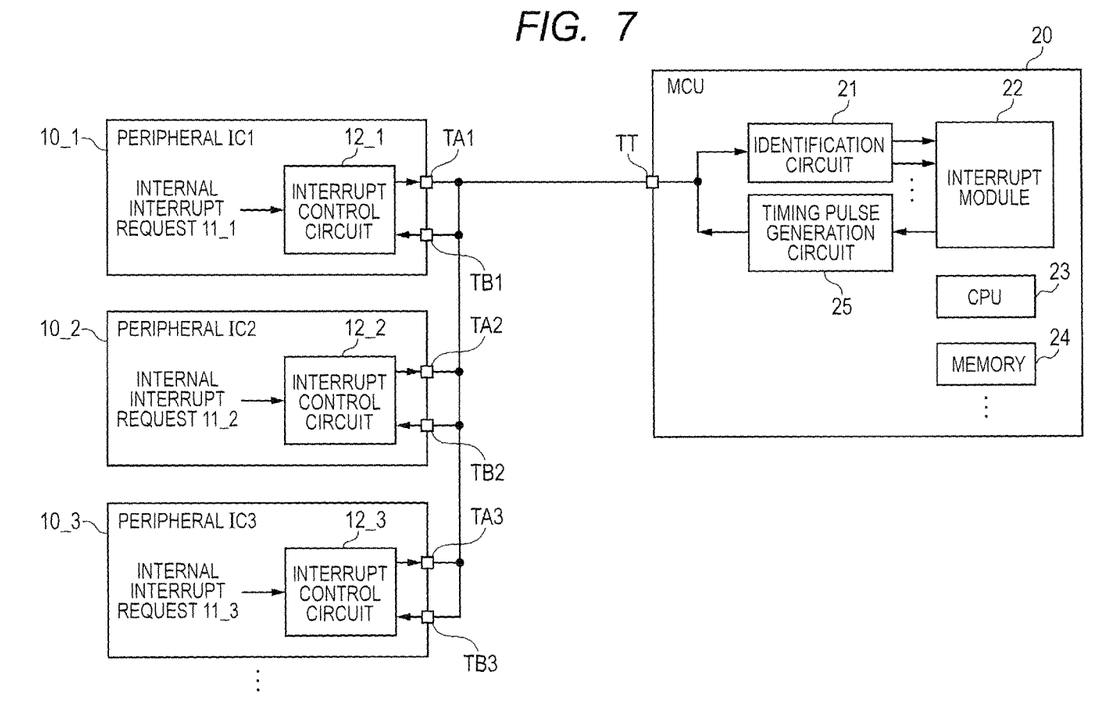
FIG. 7 is a block diagram showing the configuration of a semiconductor device according to a third embodiment of the present invention.

FIG. 7 is a block diagram showing the configuration of a semiconductor device according to the third embodiment. Compared with the semiconductor device shown in FIG. 1, in the semiconductor device shown in FIG. 7, the MCU 20 further includes a timing pulse generation circuit 25 to output the above timing pulses. Also, since interrupt conflicts cannot occur in the semiconductor device shown in FIG. 7, the OR circuit 30 shown in FIG. 1 is not provided in the semiconductor device shown in FIG. 7. Furthermore, in the semiconductor device shown in FIG. 7, the output terminals TAi and input terminals TBi of the peripheral ICs 10_i (i=1, 2, 3, - - - ) are directly coupled to the interrupt terminal TT of the MCU 20. In other respects, the semiconductor device shown in FIG. 7 is identical to the semiconductor device shown in FIG. 1. Those parts of the semiconductor device shown in FIG. 7 which are identical or equivalent to parts included in the semiconductor device shown in FIG. 1 are denoted by reference symbols identical to those used in FIG. 1, and such parts will not be described in the following.

Figure 8:
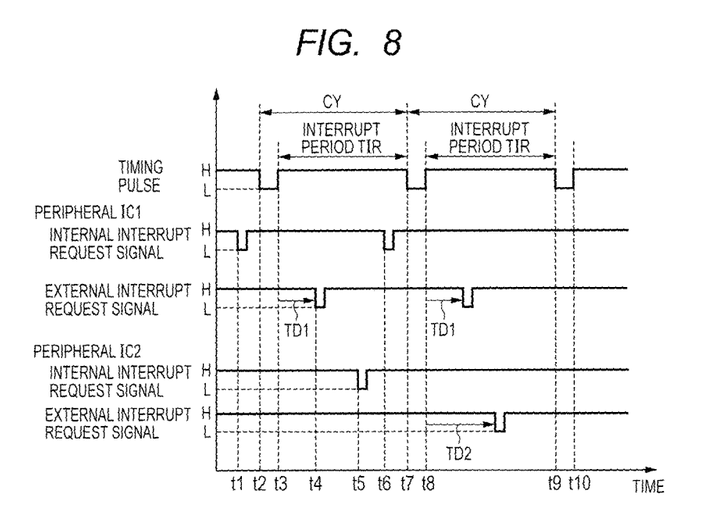
FIG. 8 is a timing diagram showing example waveforms of interrupt request signals outputted from peripheral ICs shown in FIG. 7.

FIG. 8 is a timing diagram showing example waveforms of interrupt request signals outputted from peripheral ICs shown in FIG. 7. Referring to FIGS. 7 and 8, the MCU 20 outputs, in cycles CY, timing pulses to be active (L level) between time t2 and t3, between time t7 and t8, and between time t9 and t10. Therefore, periods between time t3 and time t7 and between time t8 and time t9 are interrupt periods TIR during which external interrupt request signals can be outputted.

The interrupt control circuit 12_1 of the peripheral IC 1 (10_1) detects that an internal interrupt request signal 11_1 has become active at time t1. Then, at time t4 reached when a wait time TD1 elapses from time t3 at which a next timing pulse is outputted, the interrupt control circuit 12_1 outputs a single pulse as an external interrupt request signal. Furthermore, the interrupt control circuit 12_1 detects that the internal interrupt request signal 11_1 has become active at time t6. When a wait time TD1 elapses from time t8 at which a next timing pulse is outputted, the interrupt control circuit 12_1 outputs a single pulse as an external interrupt request signal.

Similarly, the interrupt control circuit 12_2 of the peripheral IC 2 (10_2) detects that an internal interrupt request signal 11_2 has become active at time t5. Then, when a wait time TD2 elapses from time t8 at which a next timing pulse is outputted, the interrupt control circuit 12_2 outputs a single pulse as an external interrupt request signal.

The wait times TD1 and TD2 represent unique amounts of time allocated to different peripheral ICs. The amounts of time are set not to cause coincidence between single pulses outputted as external interrupt request signals. In other words, the wait times TD1 and TD2 are set to allow the peripheral ICs to output external interrupt request signals in respective time slots allocated to them based on the timing pulses. When, as described above, single pulses are used as external interrupt request signals, the timing pulses outputted by the MCU 20 preferably have a pulse width greater than the pulse width of the single pulses outputted as interrupt request signals so as to facilitate distinction between the two kinds of single pulses.

As described above, in the semiconductor device of the third embodiment, too, like in the first and second embodiments, the number of external interrupt terminals of the microcomputer unit can be reduced to a minimum of 1 in principle.

Fourth Embodiment

Figure 9:
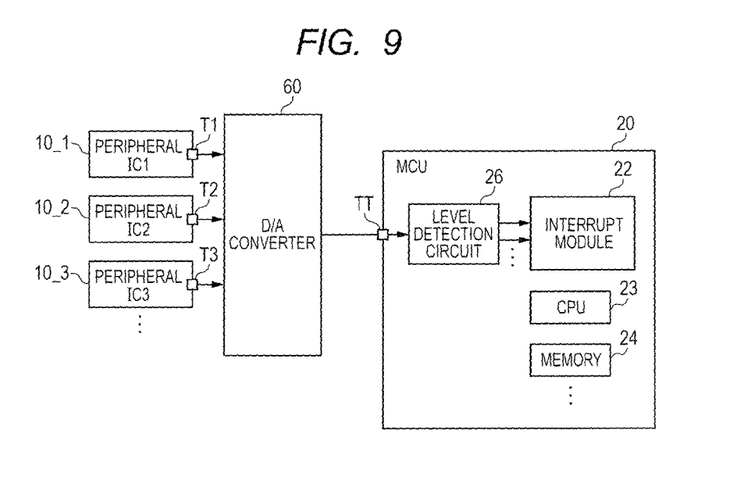
FIG. 9 is a block diagram showing the configuration of a semiconductor device according to a fourth embodiment of the present invention.

FIG. 9 is a block diagram showing the configuration of a semiconductor device according to a fourth embodiment of the present invention. Referring to FIG. 9, the semiconductor device of the fourth embodiment includes a digital-to-analog (D/A) converter 60 and the MCU 20 having an interrupt terminal TT to receive analog voltage outputted from the D/A converter 60. The interrupt signals outputted from the peripheral ICs 10_1, 10_2, - - - are at L level (low level) in a normal state and are set to H level (high level) when interrupt requests are made.

The D/A converter 60 receives interrupt request signals outputted from output terminals T1, T2, - - - of as many as n (n≥2) peripheral ICs 10_1, 10_2, - - - as a digital signal of n bits. The D/A converter 60 outputs an analog voltage corresponding to the n-bit digital signal to the MCU 20. Assume, for example, n=3. When interrupt request signals are outputted from the peripheral ICs 10_1 and 10_2 whereas no interrupt is requested by the peripheral IC 10_3, a three-bit digital signal "110" is inputted to the D/A converter 60. The D/A converter 60 then outputs an analog voltage corresponding to the digital signal "110."

The MCU 20 includes a level detection circuit 26 corresponding to the identification circuit 21 shown in FIGS. 1 and 7. The level detection circuit 26 identifies the interrupt request sources based on the analog voltage received from the D/A converter 60 via the interrupt terminal TT. The level detection circuit 26 can be configured, for example, as an analog-to-digital (A/D) converter to convert an analog voltage received back to an original n-bit digital signal. In cases where the number n of peripheral ICs 10 is small, the level detection circuit 26 can be configured to combine a comparator.

Figure 10:
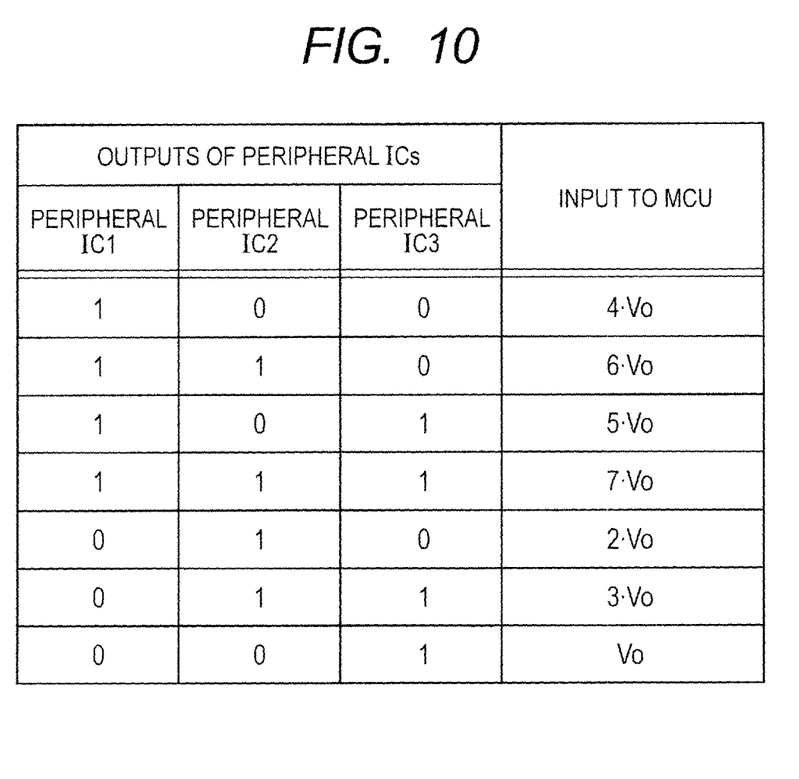
FIG. 10 is a table listing voltages inputted to the microcomputer unit corresponding to the values of interrupt request signals outputted from the peripheral ICs shown in FIG. 9.

FIG. 10 is a table listing voltages inputted to the MCU 20 corresponding to the values of interrupt request signals outputted from the peripheral ICs shown in FIG. 9. FIG. 10 is based on a case in which the number n of the peripheral ICs 10 is three and is also based on the assumption that the interrupt signal outputted from each peripheral IC is "0" in a normal state and "1" when requesting an interrupt.

Referring to FIG. 10, of an n-bit (n=3) digital signal inputted to the D/A converter 60: the highest-order bit corresponds to an interrupt request signal outputted from the peripheral IC 10_1; the second bit corresponds to an interrupt request signal outputted from the peripheral IC 10_2; and the lowest-order bit corresponds to an interrupt request signal outputted from the peripheral IC 10_3. In the example shown in FIG. 10, when a 3-bit digital value "D1-D2-D3" is received, the D/A converter 60 outputs an analog voltage represented by (4×D1+2×D2+D3)×Vo. The analog voltage is inputted to the interrupt terminal TT of the MCU 20.

As described above, the analog voltage inputted to the MCU 20 differs depending on the interrupt requests from the peripheral ICs 10. Hence, the level detection circuit 26 of the MCU 20 can easily identify the interrupt request sources based on the analog voltage inputted thereto. Even when there are conflicts between interrupt requests, the level detection circuit 26 of the MCU 20 can identify the plural peripheral ICs 10 requesting interrupts.

Figure 11:
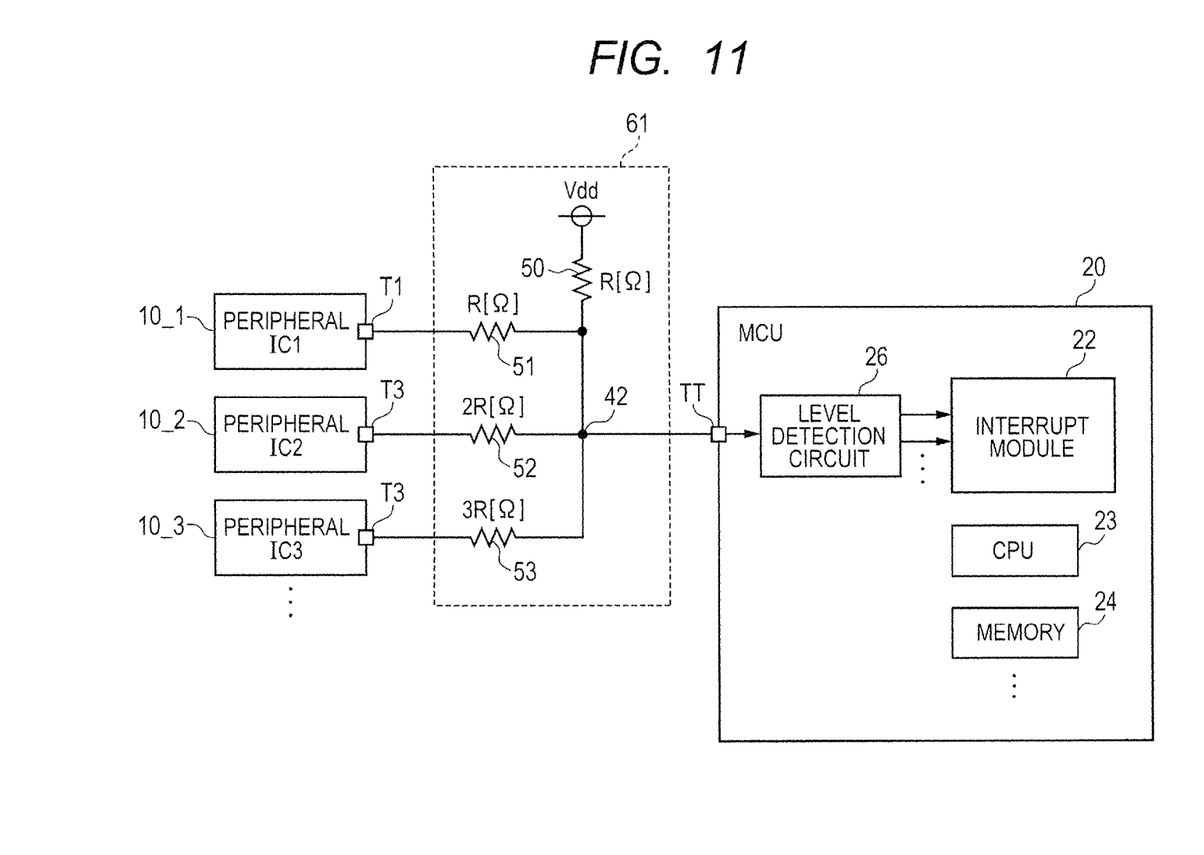
FIG. 11 is a circuit diagram showing a simple configuration example of the D/A converter shown in FIG. 9.

FIG. 11 is a circuit diagram showing a simple configuration example of the D/A converter shown in FIG. 9. In the example shown in FIG. 11, the outputs of the peripheral ICs 10_i (i=1, 2, 3, - - -) are open collector outputs or open drain outputs.

Referring to FIG. 11, a D/A converter 61 includes a pull-up resistor 50 and n output resistors 51, 52, 53, - - - corresponding to n peripheral ICs 10_1, 10_2, 10_3, - - - . The pull-up resistor 50 is coupled between a power supply node Vdd and the interrupt terminal TT of the MCU 20. Output resistors 51, 52, 53, - - - are coupled between output terminals T1, T2, T3, - - - of the corresponding peripheral ICs 10 and the interrupt terminal TT.

Respective resistance values of n output resistors 51, 52, 53, - - - differ from one another. Their resistance values are each set to be an integer multiple of a reference minimum resistance value. In the example shown in FIG. 11, with the pull-up resistor 50 having a resistance value R[Ω], the output resistors 51, 52, and 53 have resistance values of R, 2R, and 3R[Ω], respectively.

Figure 12:
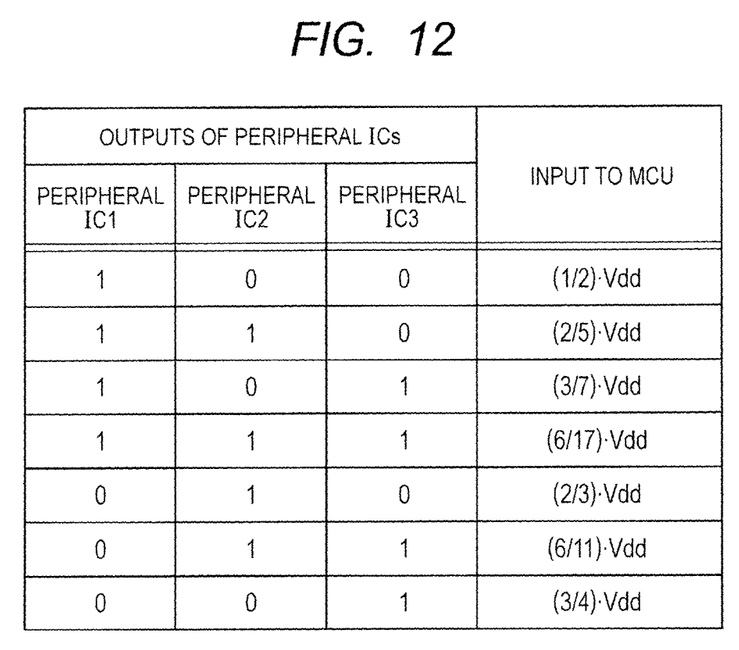
FIG. 12 is a table listing voltages inputted to the microcomputer unit corresponding to the values of the interrupt request signals outputted from the peripheral ICs shown in FIG. 11.

FIG. 12 is a table listing voltages inputted to the MCU 20 corresponding to the values of the interrupt request signals outputted from the peripheral ICs shown in FIG. 11. FIG. 12 is based on a case in which the number n of the peripheral ICs 10 is three and is also based on the assumption that the outputs of the peripheral ICs are each "1" when requesting an interrupt.

As shown in FIG. 12, the analog voltage outputted from the D/A converter 61 and inputted to the MCU 20 differs depending on the interrupt requests from the peripheral ICs 10. Hence, the level detection circuit 26 of the MCU 20 can easily identify the interrupt request sources based on the analog voltage inputted thereto. Even when there are conflicts between interrupt requests, the level detection circuit 26 of the MCU 20 can identify the plural peripheral ICs 10 requesting interrupts.

As described above, in the semiconductor device of the fourth embodiment, too, like in the first to third embodiments, the number of external interrupt terminals of the microcomputer unit can be reduced to a minimum of 1 in principle.

MODIFICATION EXAMPLES OF FIRST EMBODIMENT

Modification examples of the configuration shown in FIG. 4 according to the first embodiment will be described below. The following modification examples are also applicable almost identically to the second to fourth embodiments.

Figure 13:
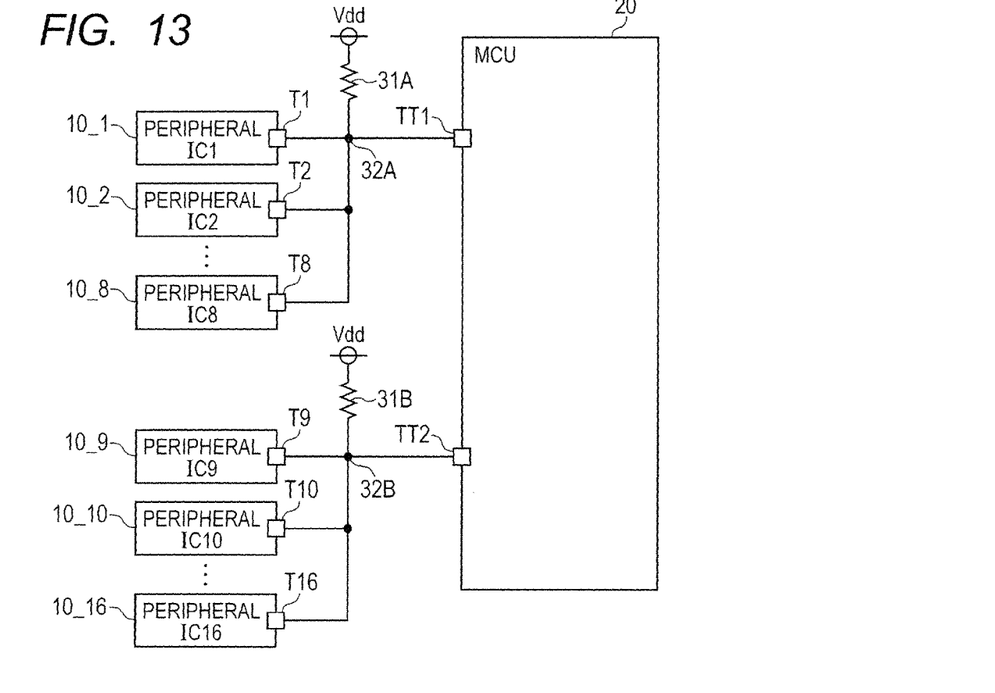
FIG. 13 is a block diagram showing a first modification example of the first embodiment.

FIG. 13 is a block diagram showing a first modification example of the first embodiment. In the example shown in FIG. 13, the MCU 20 has two interrupt terminals TT1 and TT2. The peripheral ICs 1 to 8 (10_1 to 10_8) are coupled to an interrupt terminal TT1. The peripheral ICs 9 to 16 (10_9 to 10_16) are coupled to an interrupt terminal TT2. Namely, the peripheral ICs 1 to 16 (10_1 to 10_16) can be divided into groups for coupling to different interrupt terminals TT, even though it is, in principle, possible to couple the peripheral ICs 1 to 16 (10_1 to 10_16) to a single interrupt terminal.

Figure 14:
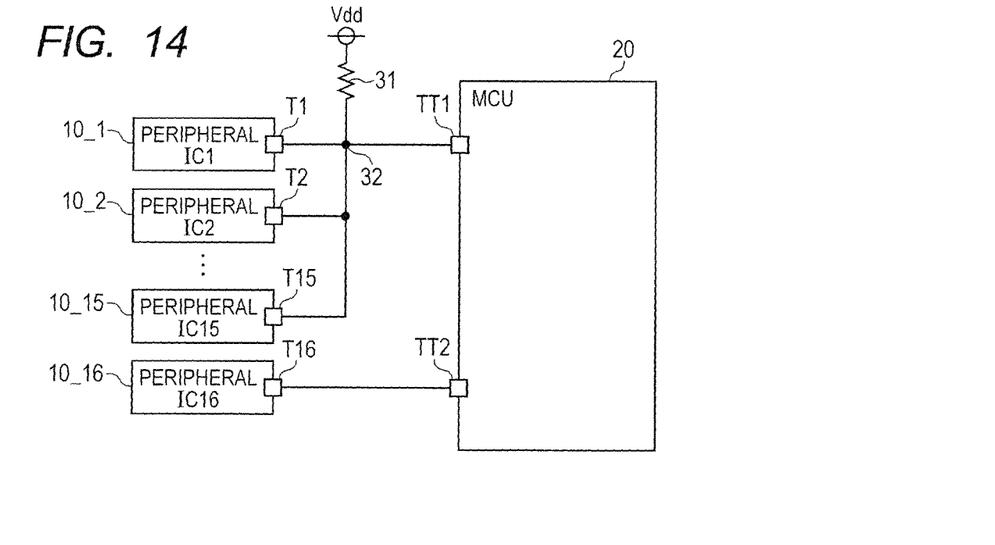
FIG. 14 is a block diagram showing a second modification example of the first embodiment.

FIG. 14 is a block diagram showing a second modification example of the first embodiment. As shown in FIG. 14, the MCU 20 includes two interrupt terminals TT1 and TT2. In the example shown in FIG. 14, the peripheral ICs 1 to 15 (10_1 to 10_15) are coupled to the interrupt terminal TT1, and the peripheral IC 16 (10_16) is coupled to the interrupt terminal TT2. Like in this case, it is possible to allocate a special interrupt terminal TT2 to a particular peripheral IC 10_16.

The invention made by the present inventors has been described in concrete terms based on embodiments of the invention. However, the present invention is not limited to the above embodiments and can be modified in various ways without departing from the scope of the invention.

What is claimed is:

1. A semiconductor device, comprising:
   a microcomputer unit having a common interrupt terminal; and
   a plurality of peripheral devices capable of outputting interrupt request signals to the interrupt terminal of the microcomputer unit,
   wherein the peripheral devices output interrupt request signals of waveforms differing between the peripheral devices to the interrupt terminal of the microcomputer unit and each receive interrupt request signals outputted from the other ones of the peripheral devices, wherein the peripheral devices are configured such that, when a first one of the peripheral devices receives an interrupt request signal outputted from a second one of the peripheral devices, the first one of the peripheral devices can output an interrupt request signal of its own only after elapse of a predetermined output inhibition time, and wherein, when an interrupt request signal is received from one of the peripheral devices, the microcomputer unit identifies the one of the peripheral devices based on the waveform of the received interrupt request signal.

2. The semiconductor device according to claim 1, wherein the waveforms of interrupt request signals outputted from the peripheral devices are such that, when the peripheral devices have simultaneously outputted interrupt request signals, the peripheral devices having outputted the interrupt request signals can be identified.

3. The semiconductor device according to claim 1,
wherein each of the peripheral devices outputs two pulses as one of the interrupt request signals, the two pulses being spaced apart by a unique amount of time specified for each of the peripheral devices, and wherein, when the two pulses are received as one of the interrupt request signals, the microcomputer unit identifies the peripheral device having outputted the two pulses based on the time interval between the two pulses.

4. The semiconductor device according to claim 1,
wherein the peripheral devices output pulse signals with mutually different cycles as the interrupt request signals, wherein the mutually different cycles of the interrupt request signals each equal an integer multiple of a fundamental cycle, and wherein, among the interrupt request signals, those with shorter cycles are outputted for longer periods.

5. The semiconductor device according to claim 1,
wherein the interrupt request signals outputted from the peripheral devices are open-collector output signals or open-drain output signals, and wherein a signal determined by wired-ORing the interrupt request signals is inputted to the interrupt terminal of the microcomputer unit.

6. A semiconductor device, comprising:
a microcomputer unit including a common interrupt terminal; and
a plurality of peripheral devices capable of outputting interrupt request signals to the common interrupt terminal of the microcomputer unit, wherein the microcomputer unit outputs reference timing pulses at predetermined intervals to the peripheral devices, and wherein the peripheral devices can output interrupt request signals in time slots allocated to the peripheral devices based on the reference timing pulses.

7. The semiconductor device according to claim 6,
wherein each of the peripheral devices outputs a single pulse as one of the interrupt request signals upon elapse, after one of the timing pulses is received, of a unique wait time specified for the each of the peripheral devices.

8. The semiconductor device according to claim 6,
wherein the timing pulses each have a pulse width larger than a pulse width of a single pulse used as one of the interrupt request signals, and wherein the peripheral devices output interrupt request signals in time slots allocated to each one of the peripheral devices based on the reference timing pulses.

9. The semiconductor device according to claim 6,
wherein the peripheral devices output interrupt request signals of waveforms differing between the peripheral devices to the interrupt terminal of the microcomputer unit and each receive interrupt request signals outputted from the other ones of the peripheral devices.

10. The semiconductor device according to claim 6,
wherein waveforms of interrupt request signals outputted from the peripheral devices are such that, when the peripheral devices have simultaneously outputted interrupt request signals, the peripheral devices having outputted the interrupt request signals can be identified.

11. The semiconductor device according to claim 6,
wherein each of the peripheral devices outputs at least two pulses as one of the interrupt request signals, the at least two pulses being spaced apart by a unique amount of time specified for each of the peripheral devices.

12. The semiconductor device according to claim 11,
wherein, when the at least two pulses are received as one of the interrupt request signals, the microcomputer unit identifies the peripheral device having outputted the at least two pulses based on the time interval between the two pulses.

13. The semiconductor device according to claim 6,
wherein the peripheral devices output interrupt request signals of waveforms differing between the peripheral devices to the interrupt terminal of the microcomputer unit.

14. The semiconductor device according to claim 6,
wherein the peripheral devices output pulse signals with mutually different cycles as the interrupt request signals.

15. The semiconductor device according to claim 14,
wherein the mutually different cycles of the interrupt request signals each equal an integer multiple of a fundamental cycle.

16. The semiconductor device according to claim 14,
wherein, among the interrupt request signals, those with shorter cycles are outputted for longer periods.

17. The semiconductor device according to claim 6,
wherein time slots are allocated to respective peripheral devices such that each peripheral device has its own time slot to initiate an interrupt.

18. The semiconductor device according to claim 6,
wherein the peripheral devices can output interrupt request signals in individual time slots, each allocated to the peripheral devices based on the reference timing pulses.

19. A semiconductor device, comprising:
a digital-to-analog converter which receives interrupt request signals outputted from as many as n (n $\geq$2) peripheral devices as a digital signal of n bits and outputs an analog voltage corresponding to the digital signal of n bits; and
a microcomputer unit having an interrupt terminal to receive the analog voltage outputted from the digital-to-analog converter, wherein the microcomputer unit identifies the peripheral devices having outputted the interrupt request signals based on the level of the analog voltage received via the interrupt terminal.

20. The semiconductor device according to claim 19,
wherein the interrupt request signals outputted from the peripheral devices are open-collector output signals or open-drain output signals,
wherein the digital-to-analog converter includes:
   a pull-up resistor coupled between the interrupt terminal and a power supply node; and
   n output resistors respectively coupled between the interrupt terminal and output nodes for outputting the interrupt request signals of the n peripheral devices, and
wherein the n output resistors have resistance values differing between the peripheral devices, the resistance values each being an integer multiple of a reference minimum resistance value.

* * * * *